United States Patent

[11] 3,603,777

[72] Inventor Gunnar Axel Kihlberg
 Sollentuna, Sweden
[21] Appl. No. 812,756
[22] Filed Apr. 2, 1969
[45] Patented Sept. 7, 1971
[73] Assignee Jungner Instrument Aktiebolaget
 Stockholm, Sweden
[32] Priority Apr. 25, 1968
[33] Sweden
[31] 5600/1968

[54] METHOD AND APPARATUS FOR GENERATING AN ELECTRICAL SIGNAL, REPRESENTING A VALUE OF A FUNCTION OF AN INDEPENDENT VARIABLE
 5 Claims, 5 Drawing Figs.
[52] U.S. Cl. .................................................... 235/197,
 235/194
[51] Int. Cl. .................................................... G06g 7/26
[50] Field of Search ........................................ 235/197,
 194, 195, 196, 150.53; 307/239, 265

[56] References Cited
 UNITED STATES PATENTS
3,264,457 8/1966 Seegmiller et al. ........... 235/197 X
3,217,148 11/1965 Robinson .................... 235/197 X
3,358,129 12/1967 Schultz ....................... 235/197 X
3,435,196 3/1969 Schmid ....................... 235/197
3,456,099 7/1969 Grindle et al. ............... 235/195

Primary Examiner—Eugene G. Botz
Assistant Examiner—Joseph F. Ruggiero
Attorney—Fred Philpitt ABSTRACT: A method of, and apparatus for, generating an electrical signal representing a value of a function of an independent variable. The method comprises the steps of generating an electrical signal, with a period T, representing the variations of the derivative $df(x)/dx$ of the function $f(x)$ within an interval $x_a \leq x \leq x_b$ including the value $x_1$, and deriving from said signal a pulse-duration modulated signal consisting of pulses having a duration of $$\frac{x_1 - x_a}{x_b - x_a} \cdot T$$

and a pulse frequency of $1/T$, said pulses indicating the variations in the derivative $df(x)/dx$ within the interval $x_a \leq x \leq x_1$, and deriving from said last-mentioned signal a DC voltage proportional to the mean value thereof and adding to this voltage a further DC voltage of a magnitude corresponding to any constant term, forming a part of the function $f(x)$. Apparatus for carrying out the method is also disclosed.

3,603,777

METHOD AND APPARATUS FOR GENERATING AN ELECTRICAL SIGNAL, REPRESENTING A VALUE OF A FUNCTION OF AN INDEPENDENT VARIABLE

The present invention relates to a method and apparatus for generating an electrical signal, representing a value of a function of an independent variable.

To provide such electrical representation of functional values it is previously known to generate a functional voltage varying periodically in correspondence with the function to be investigated, which in turn varies according to an independent variable, said functional voltage being periodically recorded or detected at times corresponding to the current value of the independent variable.

According to this prior method, however, difficulties have been encountered in attaining high accuracy in the reproduction of a certain value of the function. This is due to the fact that detecting and storing of the instantaneous value of a functional voltage can neither be carried out as fast as required, nor exactly at the right moment. Therefore, a result derived from prior methods could contain a considerable error.

The present invention has for its object to provide an improved solution of the problem of generating an electrical signal representing a value $f(x_1)$ of a function $f(x)$ of an independent variable $x$, corresponding to an arbitrary value $x_1$ of said independent variable. The method according to the invention is characterized by the steps of generating an electrical signal with a period T, representing the variations in the derivative $df(x)/dx$ of the function $f(x)$ within an interval $x_a \leq x \leq x_b$, including the value $x_1$, and deriving from said signal a pulse-duration modulated signal consisting of pulses having a duration of $$\frac{x_1 - x_a}{x_b - x_a} \cdot T ,$$

and a pulse frequency of 1/T, said pulses indicating the variations in the derivative $df(x)/dx$ within the interval $x_a \leq x \leq x_1$ and deriving from said last-mentioned signal a DC voltage proportional to the mean value thereof and adding to this voltage a further DC voltage of a magnitude corresponding to any constant term, forming part of the function $f(x)$.

The method of the present invention does not require a detecting at predetermined instants of the instantaneous magnitude of a functional voltage, but is instead based on the steps of generating a DC voltage which is proportional to the sought functional value, by averaging a signal representing the derivative of the function and consisting of a series of pulses occurring with high time accuracy. This enables very high accuracy of the electrical signal representing the functional value.

According to the invention, the periodical voltage is preferably built up as a sum of Legendre-polynoms, or derivatives of such polynoms, respectively. It may, however, be given the form of a stepped or sinusoidal function.

The invention also relates to apparatus for carrying out the method disclosed hereinbefore. This apparatus substantially comprises:

a generator, adapted to generate a periodical electrical signal representative of the derivative of a certain function $f(x)$ within a selected interval $x_a \leq x \leq x_b$;

a gate circuit adapted to derive from said signal a periodically pulse-duration modulated signal representative of the derivative $df(x)/dx$ within the interval $x_a \leq x \leq x_1$ where $x_1 \leq x_b$;

an averaging circuit emitting a DC voltage proportional to the mean value of the pulse-duration modulated signal;

an adding circuit for adding this DC voltage and a further DC voltage proportional to any constant term forming part of the function $f(x)$ and for generating a summary voltage proportional to said functional value $f(x_1)$.

The invention will be described more specifically hereinafter with reference to the accompanying drawings, in which.

Figure 1:
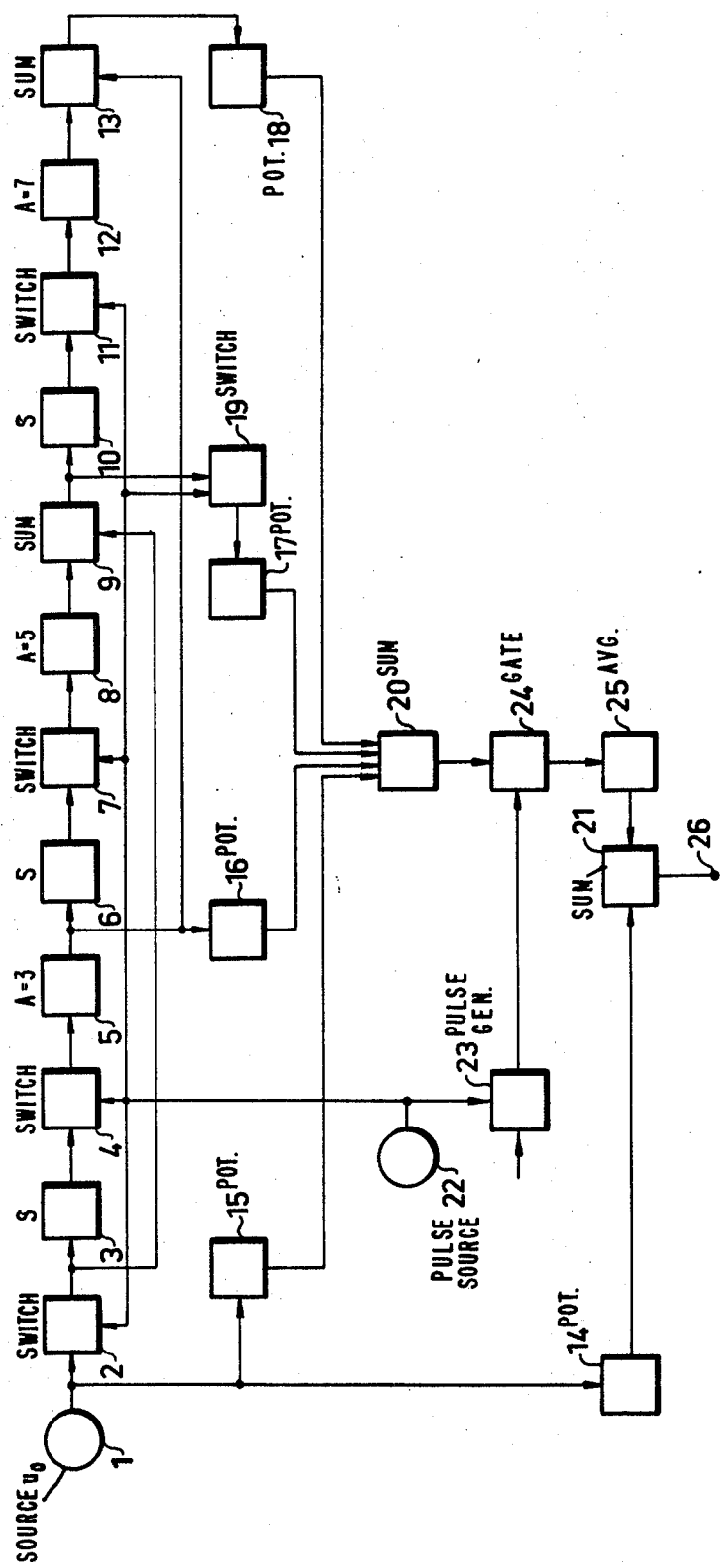
FIG. 1 is a block diagram of a system according to a first embodiment of the invention in which the functional voltage is built up as a sum of Legendre-polynoms, or derivatives of such polynoms, respectively.

In FIG. 1, numeral 1 designates a DC voltage source emitting a constant or accurately adjustable DC voltage $u_o$ which is supplied to the input of an electronic switch 2 operating as a polarity reverser controlled by a control signal $u_s$. Control signal $u_s$ is a square wave voltage having the frequency $f_s$ and causing the output signal of the switch 2 to change its polarity each time the control signal changes its sign, i.e. twice during each period. The switch 2 emits an output signal $u'_{1v}$ which is a square wave voltage having an amplitude corresponding to the magnitude of the DC voltage $u_o$ from the voltage source 1 and is supplied to the input of an integrating circuit 3, the output signal $u_{1v}$ of which is supplied to a second electronic switch 4 which, similarly to switch 2, is controlled by the voltage $u_s$. The output signal $u_1$ from switch 4 is supplied to an amplifier 5 which is in turn feeding an integrating circuit 6 with its output connected to the input of a third electronic switch 7. The output signal $u_{2v}$ of switch 7 is supplied to an amplifier 8 feeding the amplified signal to one input of an adding circuit 9 the second input of which is receiving the output voltage $u'_{1v}$ from the first switch 2. The adder 9 applies its summary signal $u'_{3v}$ to an integrating circuit 10 applying its output voltage $u_{3v}$ to a fourth electronic switch 11, which in turn is feeding an amplifier 12 with its output connected to one input of a further adding circuit 13. Adder 13 has a second input to which an output signal $u'_2$ from the amplifier 5 is applied and emits at its output a summary voltage $u'_4$. The two electronic switches 7 and 11, similarly to switches 2 and 4, are controlled by the control signal $u_s$ and serve as polarity reversers.

Numerals 14, 15, 16, 17 and 18 designate five potentiometers serving as adjustable voltage dividers, of which those designated 14 and 15 are fed with the DC voltage $u_o$ while potentiometers 16 and 18 are fed with the output voltage $u'_2$ from amplifier 5 and the output voltage $u'_4$ from adder 13 respectively, and the potentiometer 17 is fed with the output voltage $u'_3$ from an electronic switch 19 being supplied with the output voltage $u'_{3v}$ from adder 9. Potentiometers 15, 16, 17 and 18 apply part of the supply voltage, as determined by their respective tap settings, to corresponding inputs of an adding circuit 20, while the potentiometer 14 applies part of the DC voltage $u_o$, determined by its set value to an adding circuit 21.

The control voltage $u_s$ for switches 2, 4, 7, 11 and 19 is generated by a square wave generator 22, which also feeds a pulse generator 23. This pulse generator emits a pulse-duration modulated signal, which is supplied as control signal to an electronic gate 24, having an input connected to the output of the adder 20 and an output emitting a signal which is time-duration modulated in accordance with the control signal and has an amplitude equal to that of the summary signal derived from adder 20. The output signal of the gate circuit 24 is supplied to an averaging circuit 25 which applies its output signal to a second input of the adder 21. The output signal of the system is applied to a terminal 26 connected to the output of adder 21.

Figure 2:
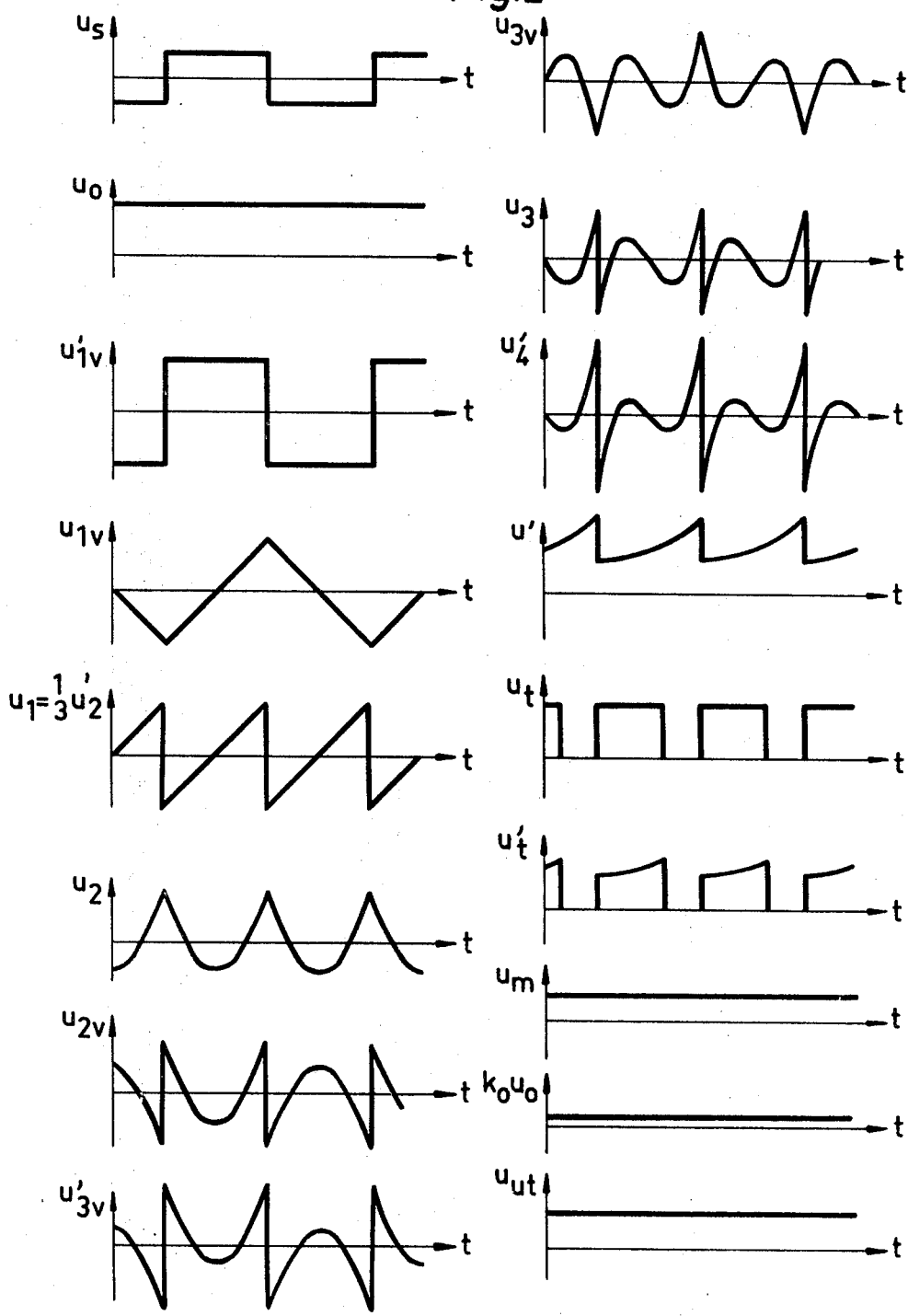
FIG. 2 illustrates a plurality of voltage-to-time curves pertaining to the system of FIG. 1.

The mode of operation of the system thus described will be explained more in detail hereinafter, reference being made to FIG. 2 which illustrates several voltage-to-time curves.

As mentioned above in the system of FIG. 1, the voltage representing the derivative of the function is built up as a sum of Legendre-polynoms, or derivatives of such polynoms.

Any arbitrary continuous function $f(x)$ may be expressed as a sum of Legendre-polynoms according to the equation:

$$f(x) = a_0 P_0(x) + a_1 P_1(x) + a_2 P_2(x) + a_3 P_3(x) + \ldots,$$

where $a_0, a_1, a_2, a_3$, etc. are constants dependent of the function $f(x)$, while $P_0(x), P_1(x), P_2(x)$, etc. represent Legendre-polynoms of successively increasing order according to the general expression:

$$P_n(x) = \frac{(2n)}{2^n(n!)^2} \cdot x^n - \frac{n(n-1)}{2(2n-1)} \cdot x^{n-2} + \frac{n(n-1)(n-2)(n-3)}{2.4(2n-1)(2n-3)} \cdot x^{n-4} + \ldots$$

Since the terms in the above-defined expression for $f(x)$ converge rapidly towards zero, a good approximation of $f(x)$ usually will be obtained already after evaluating three or four terms of said expression. The number of terms to be evaluated will naturally be determined by the desired accuracy of approximation.

The derivative of a Legendre-polynom $P_n(x)$, i.e. a polynom of the $n$:th degree, may be expressed according to the equation:

$$\frac{dP_n(x)}{dx} = \frac{dP_{n-2}(x)}{dx} + (2n-1) \cdot P_{n-1}(x)$$

This gives:

$$\frac{dP_0(x)}{dx} = 0$$

$$\frac{dP_1(x)}{dx} = P_0(x)$$

$$\frac{dP_2(x)}{dx} = 3P_1(x)$$

$$\frac{dP_3(x)}{dx} = 5P_2(x) + P_0(x)$$

$$\frac{dP_4(x)}{dx} = 7P_3(x) + \frac{dP_2(x)}{dx}$$

The system shown in FIG. 1 is based on the principle of adding periodical voltages corresponding to Legendre-polynoms of successively increasing order as to form a pulse-duration modulated voltage, periodically representing the function $df(x)/$ within the interval $x_a \leq x \leq x_b$, and deriving from this voltage, by averaging over the interval $x_a \leq x \leq x_b$, a DC voltage proportional to the value $f(x_1)$ of the function $f(x)$ corresponding to the value $x_1$ of the independent variable quantity $x$.

The system of FIG. 1 is supplied with an accurately determined DC voltage $u_o$ which represents $P_0(x)$ in the above-defined expression for $f(x)$. The voltage $u_o$ also corresponds to the derivative $dP_1(x)/dx$. To produce a periodical electrical signal representing the various Legendre-polynoms, or their derivatives, respectively, within a selected interval $x_a \leq x \leq x_b$, it is necessary to transfer the independent variable $x$ to a time scale. This is effected in the system shown by causing the polarity of the voltage $u_o$ to change by means of the switch 2, which is affected by the square wave voltage $u_s$, generated by generator 22, at the frequency of the control voltage $u_s$. Thus, at the output of this switch 2, a square wave voltage $u'_{1r}$ will be obtained, which is in synchronism with the control voltage $u_s$ and represents the derivative $dP_1(x)/dx$ with one sign during the positive half-cycles and opposite sign during the negative half-cycles of the control voltage $u_s$. The integration of the voltage $u'_{1r}$ in integrator 3 will give rise to a voltage $u_{1r}$ representing a first-degree polynom $P_1(x)$. However, this voltage too, has opposite sign during the negative half-cycles of the control voltage $u_s$.

An output voltage $u_1$ is generated by further polarity reversals in a subsequent switch 4, said voltage representing $P_1(x)$ with its correct sign during both positive and negative half-cycles of the control voltage $u_s$. It is seen from the equation $$\frac{dP_2(x)}{dx} = 3P_1(x)$$

that a voltage representing the derivative of the second-degree polynom $P_2(x)$ can be obtained by multiplying the voltage $u_1$ with the factor 3. For this reason, amplifier has been given the amplification factor 3, whereby its output voltage $u'_2$ will represent the last-mentioned derivative. The voltage $u'_2$ is integrated by integrator 6 which emits a voltage $u_2$ corresponding to the polynom $P_2(x)$. This voltage is subject to polarity reversal for every second half-cycle of the control voltage $u_s$ in a switch 7, the output signal of which consequently is designated $u_{2r}$. The amplifier 8 after switch 7 has the amplification factor 5. By adding the output voltage $5u_{2r}$ and the voltage $u'_{1r}$ in the adder 9 a voltage $u'_{3r}$ will be derived, which represents the third-degree derivative $dP_3(x)/dx$, though with opposite sign, during the negative half-cycles of the control voltage $u_s$.

Integrator 10 generates the voltage $u_{3r}$, from which, by polarity reversal in switch 11, a voltage $u_3$ is derived representing the polynom $P_3(x)$ with its correct sign. After amplification in amplifier 12 by the factor 7, this voltage is fed to the adder 13 the resulting output signal of which is a voltage equal to the sum of voltages $7u_3$ and $u'_2$. This summary voltage represents the derivative $dP_4(x)/dx$.

Before adding the voltages corresponding to the derivatives of the polynoms $P_1(x)$, $P_2(x)$, $P_3(x)$ and $P_4(x)$ to each other to form a periodical voltage representing the function derivative $df(x)/$, they will have to be weighted in respect of the constants $a_1, a_2, a_3$ and $a_4$ forming part of the expression for the function $f(x)$. This is effected by means of the potentiometers 15, 16, 17 and 18 which are fed with the voltages $u_o$ $(=u'_1)$, $u'_2$, $u'_3$ (via switch 19) and $u'_4$, respectively. The adder 20 is supplied with said voltages multiplied by the factors $k_1, k_2, k_3$ and $k_4$, respectively, as determined by the set values of the various potentiometers and the adder emits an output voltage of the form:

$$u' = k_1 u'_1 + k_2 u'_2 + k_3 u'_3 + k_4 u'_4.$$

This voltage $u'$ is fed to the set input of the gate circuit 24 the control input of which is supplied with a pulse-duration modulated control signal $u_t$ constituted by pulses of a duration determined by the set value of pulse generator 23 and having a frequency $2f_s$ (corresponding to double the frequency of control voltage $u_s$). The duration of said pulses is adjusted to correspond to the value of $x_1$ of the independent variable $x$ for which the magnitude of the function $f(x)$ is to be determined. This means that the pulse duration $t_p$ could be expressed as:

$$t_p = \frac{x_1 - x_a}{x_b - x_a} \cdot T$$

where $T = 1/2f_s$ = the period of voltages $u_t$ and $u'$.

The output signal of gate circuit 24 is a voltage $u'_t$, comprised by a series of pulses of the duration $t_p$ and repetition frequency $2f_s$ $(=1/T)$. Said pulses, which occur during a time interval $t_a + nT \leq t_a + t_p + nT$ corresponding to the interval $x_a \leq x \leq x_1$, are forming separated parts of the periodical voltage $u'$. The voltage $u'_t$ is fed to the input of the averaging circuit 25, which emits a DC voltage $u_m$ constituting the mean value of the voltage $u'_t$. The voltage $u_m$ which is represented by the equation:

$$u_m = \int_{t_a + nT}^{t_a + (n+1)T} u'_t \cdot dt \cdot \frac{1}{T}$$

will in this case be proportional to the expression $f(x) - a_0 P_0(x)$. To derive a voltage which is directly proportional to the value $f(x_1)$ of the function $f(x)$ for $x = x_1$, a further DC voltage $k_0 u_o$ representing $a_0 P_0(x)$, is added to the voltage $u_m$ in the adder 21, whereby the output voltage $u_{ut}$ of the system emitted at terminal 26 will have the form:

$$u_{ut} = k \cdot [f(x)]^{x=x_1} = k \cdot f(x_1).$$

Figure 3:
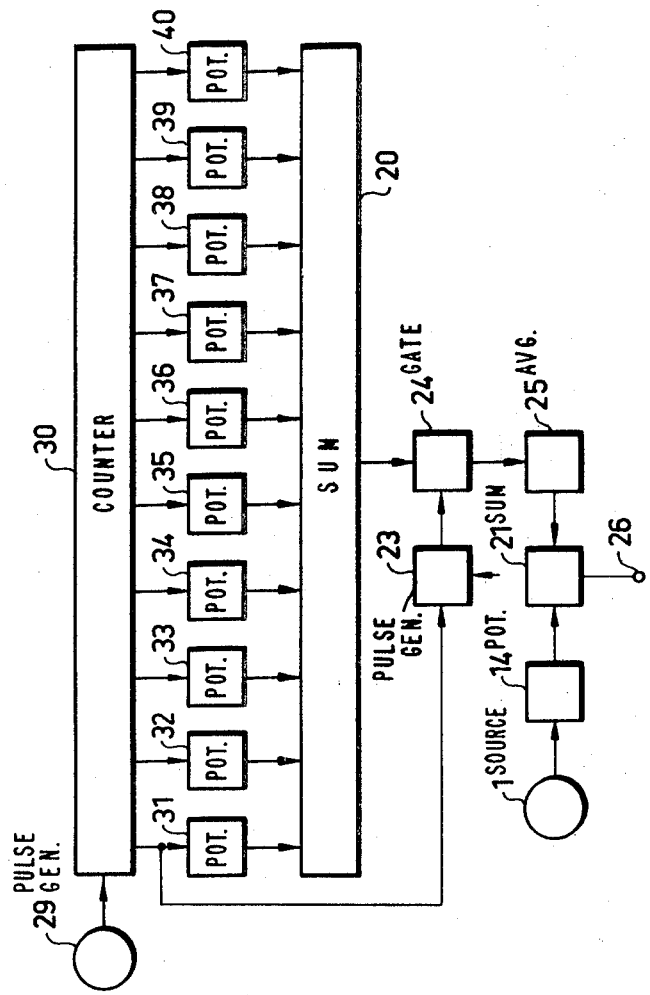
FIG. 3 is a block diagram of a system according to a second embodiment of the invention, in which the functional voltage is in the form of a stepped function.

In the system illustrated in FIG. 3, the periodical voltage $u'$, representing the derivative of the function $f(x)$ is built up as a stepped function instead of a summary of Legendre-polynoms.

Figure 4A:
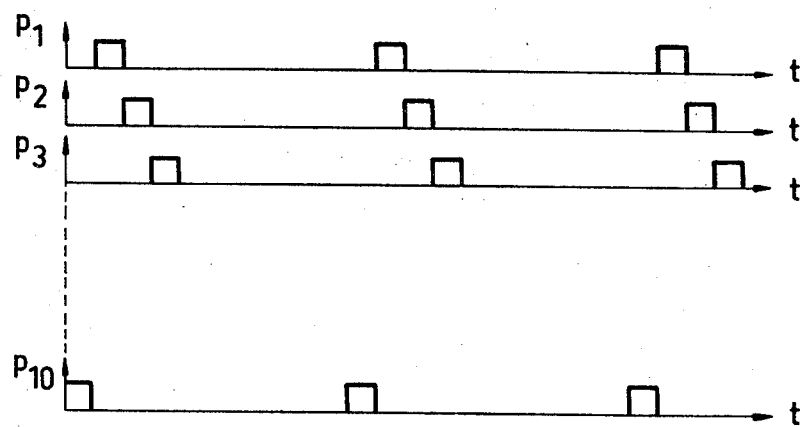
FIG. 4a and 4b illustrate a plurality of voltage-to-time curves pertaining to the system of FIG. 3.
Figure 4B:
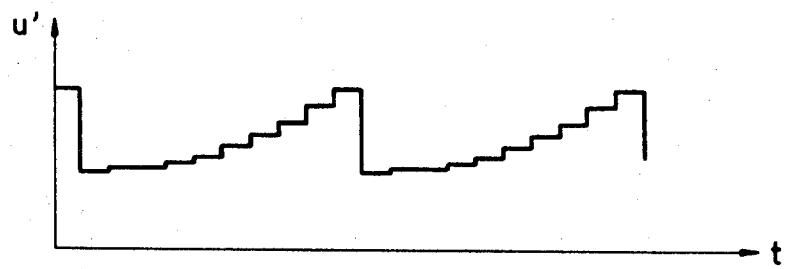

The stepped functional voltage $u'$, graphically represented in FIG. 4 is generated by means of a cyclically operating counter 30, triggered by a clock-pulse generator 29, which in the embodiment here illustrated, emits 10 cyclical pulse trains $p_1, p_2, p_3, \ldots, p_{10}$, each being fed to a weighting unit 31, 32, 33 ......, 40, respectively and constituted by potentiometers in which the pulses are multiplied by adjustable weighting factors $k_1, k_2, k_3, \ldots k_{10}$, respectively. The pulse voltages thus derived are supplied to an adder 20 which emits an output signal in the form of a stepped function voltage:

$$u' = k_1 \cdot p_1 + k_2 \cdot p_2 + \ldots \ldots \ldots \ldots k_{10} \cdot p_{10}.$$

This voltage is further processed in the system of FIG. 3 in the same way as the output voltage from adder 20 in the system of FIG. 1.

The potentiometers 14 to 18 of FIG. 1 and 14, 31 to 40 of FIG. 3, respectively, can either be supplemented by polarity changeovers or be connected to positive and negative inputs of the adders 20 and 21, respectively, to enable multiplying by weighting factors of arbitrary sign.

The invention is of course not limited to the two embodiments as described hereinbefore. In particular, it should be mentioned that the voltage $u'$ corresponding to the derivative $df(x)/$ could be generated in other ways than those described, for instance, said voltage could be built up by sinusoidal functions.

What I claim is:

1. A method of generating an electrical signal representing a value $f(x_1)$ of a function $f(x)$ of an independent variable $x$, which corresponds to an arbitrary value $x_1$ of said independent variable $x$, characterized by the following steps:

generating an electrical signal with a period representing the variations in the derivative $df(x)/dx$ of the function within an interval $x_a \leq x \leq x_b$ including the value $x_1$;

deriving from said electrical signal a pulse-duration modulated signal consisting of pulses with a duration of $$\frac{x_1 - x_a}{x_b - x_a} \cdot T$$

and a frequency of $1/T$, said pulses indicating the variations in the derivative $df(x)/dx$ within the interval $x_a \leq x \leq x_1$;

deriving from said pulse-duration modulated signal a DC voltage proportional to the mean valve thereof, and adding to this voltage a further DC voltage of a magnitude corresponding to any constant term forming part of the function $f(x)$.

2. The method according to claim 1, characterized by building up the periodical electrical signal as a sum of Legendre-polynoms, or derivatives of such polynoms, respectively.

3. The method according to claim 1, characterized by building up the periodical electrical signal as a stepwise varying function.

4. The method according to claim 1, characterized by building up the periodical electrical signal from sinusoidal functions.

5. In an apparatus for generating an electrical signal representing a value $f(x_1)$ of a function $f(x)$ of an independent variable $x$, which corresponds to an arbitrary value $x_1$ of said independent variable $x$, the improvement comprising:

generating means to generate a periodical electrical signal representative of the derivative of a certain function $f(x)$ within a selected interval $x_a \leq x \leq x_b$;

gate means to derive from said signal a periodical pulse-duration modulated signal representative of the derivative $df(x)/$within the interval $x_a \leq x \leq x_1$ where $x_1 \leq x_b$;

an averaging circuit emitting a DC voltage proportional to the mean value of the pulse-duration modulated signal;

signal means providing a signal representative of a constant term forming a part of the function $f(x)$;

an adding circuit for adding said representative signal and said DC voltage and producing an output voltage proportional to said functional value $f(x_1)$.